United States Patent [19]
Mueller et al.

[11] Patent Number: 5,199,823
[45] Date of Patent: Apr. 6, 1993

[54] AQUEOUS RESIN PREPARATIONS AND A PROCESS FOR STABILIZING ROCK AND PLUGGING CAVITIES

[75] Inventors: Heinz Mueller, Monheim; Claus-Peter Herold, Mettmann; Stephan von Tapavicza, Erkrath; Edmund Edel, Filderstadt, all of Fed. Rep. of Germany

[73] Assignees: Henkel Kommanditgesellschaft auf Aktien, Duesseldorf; E. Epple & Co. GmbH, Stuttgart, both of Fed. Rep. of Germany

[21] Appl. No.: 761,902
[22] PCT Filed: Mar. 3, 1990
[86] PCT No.: PCT/EP90/00353
  § 371 Date: Nov. 6, 1991
  § 102(e) Date: Nov. 6, 1991
[87] PCT Pub. No.: WO90/10780
  PCT Pub. Date: Sep. 20, 1990

[30] Foreign Application Priority Data
  Mar. 11, 1989 [DE] Fed. Rep. of Germany ....... 3907989

[51] Int. Cl.$^5$ .................. E02D 3/12; E21B 33/138
[52] U.S. Cl. .................. 405/264; 166/295; 523/130; 523/132
[58] Field of Search .......... 166/295; 106/900; 405/264, 266, 267; 523/130, 131, 132; 528/422

[56] References Cited

U.S. PATENT DOCUMENTS

| | | | |
|---|---|---|---|
| 3,176,471 | 4/1965 | Ramos et al. | 405/264 |
| 3,208,226 | 9/1965 | Falvey | 405/264 |
| 3,237,691 | 3/1966 | Koch et al. | 166/295 |
| 3,282,338 | 11/1966 | Walther et al. | 166/295 |
| 3,495,412 | 2/1970 | Sakata et al. | 405/264 |
| 3,599,433 | 8/1971 | Murata et al. | 523/130 X |
| 4,114,382 | 9/1978 | Kubens et al. | 405/264 |
| 4,473,119 | 9/1984 | Falk | 166/295 |
| 5,028,344 | 7/1991 | Hoskin | 166/295 |

FOREIGN PATENT DOCUMENTS 1106301 3/1988 United Kingdom.

Primary Examiner—George A. Suchfield
Attorney, Agent, or Firm—Ernest G. Szoke; Wayne C. Jaeschke; Real J. Grandmaison

[57] ABSTRACT

The invention relates to aqueous preparations of acid-catalyzed melamine resins and/or urea-formaldehyde condensates which contain an addition of zeolite NaA and/or hydroxysodalite to increase their usefulness. The preparations in question are particularly suitable for use in the stabilization of rock and/or plugging of cavities, for example in tunneling and mining. Accordingly, the invention also relates to a process for stabilizing rock, for example in tunneling and mining, by injection of corresponding preparations together with an acidic catalyst.

17 Claims, No Drawings

AQUEOUS RESIN PREPARATIONS AND A PROCESS FOR STABILIZING ROCK AND PLUGGING CAVITIES

BACKGROUND OF THE INVENTION

1. Field of the Invention

This invention relates to improvements in aqueous resin systems based on melamine resins and/or urea-formaldehyde resins which are used for stabilizing rock and for plugging cavities.

2. Discussion of Related Art

The improvement of rock strength by injection of auxiliary chemicals typically made up with water is an old and multifarious problem. Various suspensions, emulsions or solutions are available as sealing and stabilizing media. Cement and inorganic sodium silicates are basically inexpensive and economical, but can only be sensibly used where rock permeability is sufficiently high and few, if any, aggressive waters are present. Improved working conditions and strength properties are obtained through the use of organic resins. The resins may be used in the form of solutions and/or suspensions and/or emulsions, considerable possibilities in regard to the modification of strength, viscosity, adhesiveness of the stabilizing material to the rock and the like being afforded by the particular choice of the resins. Various types of resins have been proposed for the purpose in questions, including for example epoxy resins, polyurethanes and other thermoplastics and thermosets.

Today, particular significance is attributed to systems based on polyurethanes of the type described, for example, in the journal "Glückauf", 112 (1976), 803–807. On account of the high toxicity of isocyanates, however, these systems are being used increasingly less for ecological reasons.

Melamine- and urea-formaldehyde resins have also been proposed, normally being injected in aqueous solution or suspension into the rock to be cemented where they cure in largely predeterminable times under the effect of a catalyst applied at the same time. The catalysts used for the resins in question are acidic and/or alkaline systems, particular significance being attributed to the acidic systems and, among these, to the mineral acids. The prior art relating to improvements in rock strength by chemical injections, particularly in connection with the plugging of oil and gas wells, is represented for example by DE-AS 11 53 698 and by the Article by H. Barthel "Verbesserung der Gebirgsfestigkeit durch chemische Injektionen (Improving Rock Strength by Chemical Injections)", Bergb.-Wiss. 17 (1970), No. 8, 281 to 285.

A technological difficulty attending the use of melamine- or urea-formaldehyde systems lies in the instability of aqueous preparations of such resins which, even in the absence of acidic catalysts, undergo a considerable increase in viscosity relatively quickly, so that their processability is impaired. In particular, the injectability and penetrative power of the injected resin solution are increasingly impaired. In practice, therefore, the resin solutions or suspensions to be applied are prepared immediately before use and have to be applied relatively quickly thereafter.

The problem addressed by the present invention was to find a way of substantially improving the stability in storage of aqueous resin preparations of the type in question based on melamine- and/or urea-formaldehyde resins. This was to be possible even when the active substance contents of the aqueous preparations were, desirably, relatively high at more than 50% by weight, for example in the range from about 60 to 75% by weight.

DESCRIPTION OF THE INVENTION

Other than in the operating examples, or where otherwise indicated, all numbers expressing quantities of ingredients or reaction conditions used herein are to be understood as modified in all instances by the term "about".

Essentially, the invention is based on the observation that, by using limited quantities of a selected synthetic zeolite compound, sodium zeolite A and also, to a lesser extent, the hydroxysodalite derived therefrom, it is possible to achieve the desired stability in storage of the aqueous resin preparations so that they remain stable in storage for periods of a few months at room temperature.

In a first embodiment, therefore, the present invention relates to aqueous preparations of acid-catalyzed melamine resins and/or urea-formaldehyde condensates which are particularly suitable for use in the stabilization of rock and/or plugging of cavities and are characterized in that, to increase their usefulness and particularly to extend their storage life, they contain an addition of zeolite NaA and/or hydroxysodalite.

In another embodiment, the invention relates to an improved process for stabilizing rock, for example in tunnel construction, by injection of aqueous preparations of melamine resin and/or urea-formaldehyde condensates together with an acidic catalyst, characterized in that aqueous preparations are used which contain zeolite NaA and/or hydroxysodalite suspended together with the melamine resin and/or urea-formaldehyde condensates and, before injection, are mixed with a preferably aqueous solution of the acidic catalyst.

Finally, in another embodiment, the invention relates to the use of zeolite NaA and/or hydroxysodalite in aqueous preparations of acid-catalyzed melamine resins and/or urea-formaldehyde condensates for improving their usefulness and extending their storage life.

The content of curable resin active substance in aqueous preparations of the type in question is typically in the range from about 50 to 80% by weight and preferably in the range from about 55 to 75% by weight. It has been found that even the addition of small quantities of the finely divided mineral stabilizers mentioned and, in particular, the addition of very small quantities of zeolite NaA is sufficient to produce a surprisingly effective extension of storage life. Storage life is determined by comparing the viscosity of the material before and after ageing.

More particularly, it has been found that even quantities of only about 0.1% by weight and, preferably, quantities of at least about 0.5% by weight of zeolite NaA, based in each case on the active substance content of the aqueous resin preparation, are sufficient to produce the desired increase in storage life. Particularly suitable additions of the mineral stabilizers mentioned are in the range from about 0.1 to 20% by weight and preferably in the range from about 0.5 to 15% by weight. Additions of from about 1 to 10% by weight are entirely sufficient for ensuring a storage life at room temperature of, for example, 2 to 3 months.

Another embodiment of the invention is characterized in that urea is additionally added to the aqueous resin preparations and is dissolved in the aqueous phase. It has been found in this regard that the unwanted emission of formaldehyde can be suppressed by this measure to below the detection limit of formaldehyde. This is understandably a considerable advantage where these injection solutions are applied in tunnel construction for example. According to the invention, the preferred urea contents of the injection solution are from about 10 to 40% by weight and, more preferably, from about 15 to 25% by weight, again based on the active substance content of the aqueous solution of reactive resins.

The resin solution is cured in known manner by acidic catalysis, more particularly by the addition of mineral acids. Although, basically, any mineral acid is suitable for initiating the curing reaction, it is often advisable to use phosphorous acid. It is known that this acid has the advantage that it does not attack iron components to any real extent so that no hydrogen is formed.

The mineral acids are preferably added to and mixed with the resin-containing injection solutions before application in the form of aqueous solutions. It can be particularly useful in this regard initially to mix the mineral acids into aqueous electrolyte salt solutions and to mix the acids diluted in this form with the resin preparation to be injected. Suitable electrolyte salts are, in particular, water-soluble salts of the alkali and/or alkaline-earth metal group, particular significance being attributed to the salts of sodium, calcium and/or magnesium. Readily water-soluble salts of this class, particularly the chlorides, but even water-soluble sulfates, are suitable representatives of these electrolyte salts. Examples are sodium chloride and calcium chloride. The mineral acids are used in particular in a concentration of from about 10 to 30% by weight in the electrolyte salt solution which in turn contains the electrolyte salts in quantities of from about 10 to 40% by weight. The quantity of mineral acid used for curing, based on resin active substance, is in the usual range, for example from about 1 to 15% by weight.

The following Examples, in the form of comparison tests, demonstrate the stabilizing effect of adding the finely divided mineral components, particularly zeolite NaA, in accordance with the invention. Zeolite NaA itself and its production are described in detail in the prior art, cf. for example the basic U.S. Pat. No. 2,882,243 (Milton) and the book by Donald W. Breck entitled "Zeolite Molecular Sieves - Structure, Chemistry and Use", John Wiley and Sons, New York/London, 1974, page 133 and also the many other references in this book to the typical oxide formula, the crystallographic data and the structural properties. Today, synthetic crystalline zeolite NaA is used industrially as a sodium tripolyphosphate substitute in detergents and cleaning preparations, particularly laundry detergents. The detergent qualities of zeolite NaA are particularly suitable for use in accordance with the invention. Hydroxysodalite and its production are also described in the cited literature.

EXAMPLES

Example 1

The storage life of an aqueous preparation of a melamine/urea-formaldehyde condensate predominantly containing melamine resin is investigated in a first series of tests. The effect of adding increasing quantities of urea to the melamine resin solution is determined in a first series of experiments. The melamine resin used is a commercial product. The viscosities of the solutions in mPas are measured immediately after addition of the urea to the melamine resin solution in the quantities shown and after storage for a period of 2 months at room temperature. The following results are obtained:

|   |   | Viscosity in mPas | |
|---|---|---|---|
|   |   | Immediately | After 2 months |
| a) | Melamine resin solution | | |
|   | + 10% by weight urea | 900 | 3400 |
|   | + 20% by weight urea | 625 | 2990 |
|   | + 30% by weight urea | 500 | 2150 |
|   | + 40% by weight urea | 325 | 1940 |

In another series of tests, the melamine resin solution having the stated composition is mixed with 20% by weight urea. Increasing quantities of zeolite NaA and, in a comparison test, a small quantity of hydroxysodalite are then added to separate samples of this solution. The percentages by weight shown in Table b) below for the quantities of zeolite and hydroxysodalite added are based on the system as a whole, the figure for urea (20% by weight) being based on the active substance content of the resin solution.

In this case, too, the particular stabilizing effects were determined by measuring the viscosity of the aqueous preparations immediately after their production and after storage for 2 months at room temperature.

|   |   | Viscosity in mPas | |
|---|---|---|---|
|   |   | Immediately | After 2 months |
| b) | Melamine resin solution | | |
|   | + 20% by weight urea | 625 | 2990 |
|   | + 0.5% by weight zeolite NaA | 650 | 810 |
|   | + 1% by weight zeolite NaA | 650 | 480 |
|   | + 10% by weight zeolite NaA | 650 | 400 |
|   | + 0.5% by weight hydroxy sodalite | 650 | 1600 |

Determination of the formaldehyde concentration in the air above the particular material samples shows that, beyond an addition of approximately 10% by weight urea to the 60% melamine resin solution, the free formaldehyde content is reduced to levels below 0.3 ppm.

Example 2

Various quantities of phosphorous acid are added to an aqueous starting material containing 60% by weight melamine resin. The phosphorous acid is used in the form of a 70% solution in aqueous medium, distilled water, tapwater, a 15% sodium chloride solution, saturated sodium chloride solution and a saturated calcium chloride solution being used as the aqueous medium in comparison tests.

The curing time of the various mixtures is determined in separate tests, comparison tests being carried out at room temperature, at 40° C. and at 70° C. The curing time defined as the period of time beyond which the system can no longer be stirred with a spatula in a small-scale test. A period of 1 hour (1 h) is selected as the upper time limit for the comparatively slow-curing systems. If the curing time is below that limit, it is shown in minutes (') and seconds ("). The curing times determined in these comparison tests are shown in the following Table.

| Conditions 60% resin solution | +2% acid solution | +6% acid solution | +10% acid solution | +14% acid solution |
|---|---|---|---|---|
| Curing time at RT/40° C./70° C. in | RT/40° C./70° C. | RT/40° C./70° C. | RT/40° C./70° C. | RT/40° C./70° C. |
| a) Dist. water | 1h/1h/11' 53" | 45'/11'/4' 41" | 4'/3' 11"/1' 56" | 3'/2' 05"/52" |
| b) Tapwater | 1h/1h/8' 24" | 45'/12' 05"/3' 29" | 4' 05"/3' 23"/1' 50" | 3'/1' 15"/55" |
| c) 15% NaCl solution | 1h/41' 20"/13' | 18'/11' 03"/5' | 3'/2' 10"/1' 22" | 2'/55"/29" |
| d) Sat. NaCl solution | 1h/35'/12' | 25'/10' 05"/4' 05" | 1' 41"/1' 32"/1' 02" | 55"/49"/24" |
| e) Sat. CaCl solution | 1h/30'/7' 29" | 6' 40"/5'/2'/35" | 1' 49"/1' 29"/1' 17" | 1' 08"/45"/33" |

What is claimed is:

1. An aqueous composition for stabilizing rock or plugging of cavities in tunnel construction and mining, said composition comprising an acid catalyzable resin selected from the group consisting of melamine, urea-formaldehyde, and mixtures thereof, and a viscosity stabilizer for said resin selected from the group consisting of zeolite NaA, hydroxysodalite, and mixtures thereof, said viscosity stabilizer serving to extend the storage life and usefulness of said composition.

2. An aqueous composition as in claim 1 wherein said viscosity stabilizer is present therein in an amount of from about 0.1 to about 20 percent by weight, based on the active substance content of said composition.

3. An aqueous composition as in claim 1 wherein said resin is present in an amount of from about 50 to about 80 precent by weight, based on the weight of said composition.

4. An aqueous composition as in claim 1 containing from about 10 about 40 percent by weight of urea, based on the active substance content of said composition.

5. An aqueous composition as in claim 1 containing from about 10 to about 40 percent by weight of electrolyte salts, based on the weight of said composition.

6. An aqueous composition as in claim 5 wherein said electrolyte salts are selected from the group consisting of alkali metals and alkaline earth metals.

7. An aqueous composition as in claim 5 wherein said electrolyte salts are selected from the group consisting of salts of sodium, calcium, and magnesium.

8. The process of stabilizing rock or plugging of cavities in tunnel construction and mining, comprising injecting into said rock or cavities an aqueous composition comprising a resin selected from the group consisting of melamine, urea-formaldehyde, and mixtures thereof, an acid catalyst for said resin, and a viscosity stabilizer for said resin selected from the group consisting of zeolite NaA, hydroxysodalite, and mixtures thereof, said viscosity stabilizer serving to extend the storage life and usefulness of said composition.

9. The process as in claim 8 wherein said viscosity stabilizer is present therein in an amount of from about 0.1 to about 20 percent by weight, based on the active substance content of said composition.

10. The process as in claim 8 wherein said resin is present in an amount of from about 50 to about 80 percent by weight, based on the weight of said composition.

11. The process as in claim 8 wherein said composition contains from about 10 to about 40 percent by weight of urea, based on the active substance content of said composition.

12. The process as in claim 8 wherein said acid catalyst comprises a mineral acid.

13. The process as in claim 8 wherein said acid catalyst comprises phosphorous acid.

14. The process as in claim 8 wherein said composition contains from about 10 to about 40 percent by weight of electrolyte salts, based on the weight of said composition.

15. The process as in claim 14 wherein said electrolyte salts are selected from the group consisting of alkali metals and alkaline earth metals.

16. The process as in claim 14 wherein said electrolyte salts are selected from the group consisting of salts of sodium, calcium, and magnesium.

17. The process as in claim 8 wherein said acid catalyst is present in an amount of from about 1 to about 15% by weight, based on the weight of said resin.

* * * * *